United States Patent
Weerapurage et al.

(10) Patent No.: US 11,449,909 B2
(45) Date of Patent: Sep. 20, 2022

(54) CUSTOMIZABLE FORMULA BASED DYNAMIC API EVALUATION USING A DATABASE SYSTEM

(71) Applicant: Salesforce.com, Inc., San Francisco, CA (US)

(72) Inventors: Dinesh Weerapurage, San Francisco, CA (US); Lahiru Pileththuwasan Gallege, Knoxville, TN (US); Kenneth Cavagnolo, Knoxville, TN (US); Chris Groer, Knoxville, TN (US); Abraham Reyes, Atlanta, GA (US)

(73) Assignee: salesforce.com, inc., San Francisco, CA (US)

( * ) Notice: Subject to any disclaimer, the term of this patent is extended or adjusted under 35 U.S.C. 154(b) by 213 days.

(21) Appl. No.: 16/751,639

(22) Filed: Jan. 24, 2020

(65) Prior Publication Data

US 2021/0233126 A1    Jul. 29, 2021

(51) Int. Cl.
  *G06Q 30/02*    (2012.01)
  *H04L 41/5051*    (2022.01)
  *H04L 67/01*    (2022.01)

(52) U.S. Cl.
  CPC ..... *G06Q 30/0283* (2013.01); *H04L 41/5051* (2013.01); *H04L 67/01* (2022.05)

(58) Field of Classification Search
  CPC .. G06Q 30/0283; H04L 41/5051; H04L 67/42
  See application file for complete search history.

(56) References Cited

U.S. PATENT DOCUMENTS

| | | | | |
|---|---|---|---|---|
| 10,242,571 | B1* | 3/2019 | Stewart | G06F 17/11 |
| 10,274,326 | B1* | 4/2019 | Stewart | H04W 4/024 |
| 2014/0310249 | A1* | 10/2014 | Kowalski | G06F 16/9535 |
| | | | | 707/688 |
| 2015/0079927 | A1* | 3/2015 | Hageman | H04L 12/1485 |
| | | | | 455/406 |
| 2015/0169385 | A1* | 6/2015 | Allen | G06F 9/541 |
| | | | | 719/328 |
| 2015/0269377 | A1* | 9/2015 | Gaddipati | G06F 21/44 |
| | | | | 726/30 |
| 2016/0119405 | A1* | 4/2016 | Karpoor | G06Q 10/06 |
| | | | | 709/217 |
| 2018/0108023 | A1* | 4/2018 | Stewart | G06F 3/0481 |
| 2018/0232402 | A1* | 8/2018 | Bhatti | G06F 16/9024 |
| 2018/0287896 | A1* | 10/2018 | Caputo, II | H04W 4/60 |
| 2018/0342115 | A1* | 11/2018 | Chen | G07C 5/008 |
| 2019/0034199 | A1* | 1/2019 | Pollock | G06F 8/73 |
| 2019/0113345 | A1* | 4/2019 | Stewart | G06Q 30/0205 |
| 2019/0129773 | A1* | 5/2019 | Suter | G06F 11/3612 |
| 2019/0149344 | A1* | 5/2019 | Kim | H04L 67/1002 |
| | | | | 705/400 |
| 2019/0149424 | A1* | 5/2019 | O'Neill | G06F 9/4843 |
| | | | | 709/224 |
| 2019/0259047 | A1* | 8/2019 | Bharti | G06Q 30/0201 |

(Continued)

*Primary Examiner* — Chris Parry
*Assistant Examiner* — Hassan A Khan
(74) *Attorney, Agent, or Firm* — Kwan & Olynick LLP

(57) ABSTRACT

Described herein are systems, apparatus, methods and computer program products for implementing dynamic API cost models. The dynamic API cost models may determine the cost of usage of a specific API based on a plurality of factors, such as the value of the API to the client as well as the usage of computational resources and other factors.

20 Claims, 13 Drawing Sheets

(56) References Cited

U.S. PATENT DOCUMENTS

| | | | | |
|---|---|---|---|---|
| 2019/0317842 A1* | 10/2019 | Bharti | ................... | G06F 16/285 |
| 2019/0349210 A1* | 11/2019 | Nayak | ................... | H04M 15/58 |
| 2020/0019888 A1* | 1/2020 | McCourt | ................ | G06N 7/005 |
| 2020/0267008 A1* | 8/2020 | Chen | ........................ | H04W 4/24 |
| 2020/0380478 A1* | 12/2020 | Omori | ................. | G06Q 20/405 |
| 2020/0394654 A1* | 12/2020 | Concannon | .......... | G06Q 20/388 |
| 2021/0194710 A1* | 6/2021 | Konno | ................. | G06Q 20/145 |

\* cited by examiner

CUSTOMIZABLE FORMULA BASED DYNAMIC API EVALUATION USING A DATABASE SYSTEM

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever

FIELD OF TECHNOLOGY

This patent document relates generally to application programming interfaces (API) and, more specifically, to valuation of services provided through APIs.

BACKGROUND

Modern software often provides capabilities resulting from usage of APIs. Typically, API usage involves receiving a request from a client (e.g., a party requesting usage of the API), performing a specific operation with the API, and returning a response resulting from performing the specific operation to the client. The specific operations may be as simple as performing arithmetic to as complex as solving a vehicle routing problem. Each such operation may be performed by an API. Typically, the clients provide monetary compensation for the usage of these APIs via a basic transactional monetization model where one successful request/response is billed as one transaction.

BRIEF DESCRIPTION OF THE DRAWINGS

The included drawings are for illustrative purposes and serve only to provide examples of possible structures and operations for the disclosed inventive systems, apparatus, methods and computer program products for a dynamic API monetization system. These drawings in no way limit any changes in form and detail that may be made by one skilled in the art without departing from the spirit and scope of the disclosed implementations.

DETAILED DESCRIPTION

Some implementations of the disclosed systems, apparatus, methods and computer program products are configured for implementing dynamic API cost models. In certain situations, a client may request utilization of an API. Once the request is received, the API performs the operation requested by the client and returns a response based on the operation. Typically, the clients may provide monetary compensation for the usage of APIs via a basic transactional monetization model where one successful request/response is billed as one transaction. However, there are cases where the execution cost, customer value, or market value of an API response exceeds this simple transactional design.

For example, an API for vehicle routing and scheduling optimization may be able to solve simple problems as well as complex problems via the same API. The latter requires significant computational overhead and usually has a significantly higher value to the customer due to the intractable nature of some optimization problems. In such an example, a dynamic API monetization system that adjusts the cost of API usage based on certain factors more optimally captures the value for the API provider and/or the client. As such, the dynamic API cost models described herein allow for API usage to be tailored to the nature of the services provided by the API provider and/or the needs and value of the client.

Consider the example of Ahsoa, Inc., a provider of a map routing API that optimizes travelers' routes based on the amount of time they have to spend on the road and their desire for adventure. Ahsoa, Inc.'s service receives a list of destinations that a traveler wishes to visit, the number of days that the traveler has available to travel, the route preference of the traveler, as well as the budget available for accommodations and the type of experienced desired. Ahsoa's API is available for use by a variety of travel booking services, travel planning services, and other service providers. The clients of such services run the gamut from budget sites to sites that cater to wealthy travelers. However, because the API is configured in accordance with conventional techniques, Ahsoa's monetization model only charges on a per use model, regardless of the complexity of the request or the value to the end user. Due to utilizing such a model, Ahsoa stands to lose a large amount of revenue.

In an effort to capture additional revenue, Ahsoa switches to a dynamic API cost model provided in accordance with techniques and mechanisms described herein. Such a dynamic API cost model varies the cost of APIs based on the computational resources required to process the request, the complexity of the request, an estimated value to the client requesting the processing, and the local market of the client. Thus, the dynamic API cost model determines a different cost per request. The model is better able to capture the true value of the request.

Figure 1:
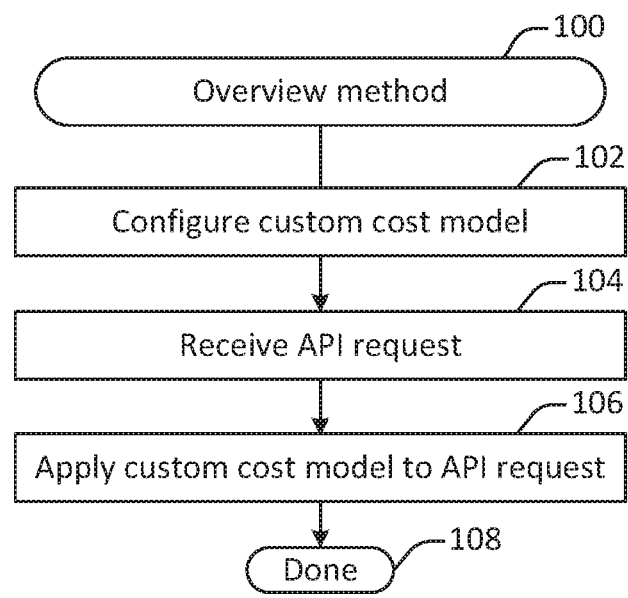
FIG. 1 illustrates an example of a method for applying dynamic API cost models, performed in accordance with one or more embodiments.

FIG. 1 illustrates an example of a method for applying dynamic API cost models, performed in accordance with one or more embodiments. FIG. 1 illustrates method 100 that configures and applies custom cost models, as described herein.

In operation 102, one or a plurality of custom cost models are configured. Each of the custom cost models may be configured to receive a plurality of inputs and determine an API usage cost based on the inputs. In some embodiments, cost models may be associated with one or more specific clients, while other embodiments may include cost models that are not associated with specific clients and selected based on the inputs received from the API request (e.g., on a case by case basis). In certain embodiments, configuring cost models may not be performed as frequently as API requests are received. Thus, operation 102 may be performed once or a number times that is less than that of operations 104 and 106. For example, operation 102 may be performed once for a particular API, while operations 104 and 106 may be performed for each API request.

In operation 104, an API request is received from a client device associated with a client. The API request may identify the API requested for usage and the parameters associated with operation of the API. Thus, for example, the request may identify the operations to be performed by the API, any limitations or preferred requests, the end user, any services that will utilize the output of the API, the geographic location of the client and/or end user, and/or other such parameters.

Based on the API request, a custom cost model may be selected and applied in operation 106. Thus, for example, the parameters identified in the API request received in operation 104 may be used to select one of the cost models. Additionally, the parameters may be used as inputs into the cost model. Based on such inputs, the cost model may provide an output identifying the usage cost for the API. The technique finishes in operation 108.

Figure 2:
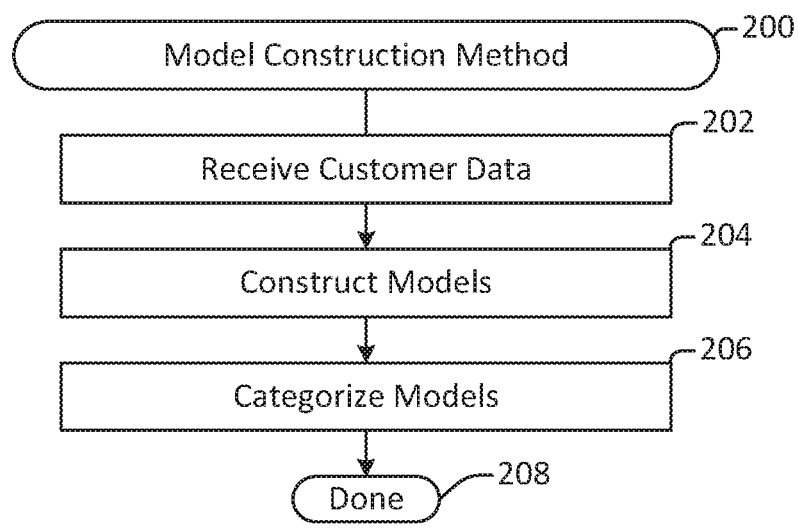
FIG. 2 illustrates an example of a method of constructing dynamic API cost models, performed in accordance with one or more embodiments.

FIG. 2 illustrates an example of a method of constructing dynamic API cost models, performed in accordance with one or more embodiments. Such dynamic API cost models may be used in determining the usage cost for a specific usage instance of an API.

In operation 202, customer data is received. The customer data may include any data associated with the customer or client. Such data may include, for example, the identity of the client, the client's business model, the geographic areas that the client is active within, the identity of the end user of the client's services, the regulatory regime of the client, and the products and services provided by the client. Other embodiments may include other data.

The customer data may be used to construct cost models in operation 204. That is, the cost models may be constructed to utilize one, some, or all of the customer data received in operation 202 as inputs. The cost models may utilize the inputs and, through transformation of the inputs, provide an output reflecting the determined cost of utilizing the cost model. Transformation of the input may include one or a plurality of calculations utilizing the inputs. Thus, for example, the transformation may include applying a formula. Applying such a transformation may result in a determined cost for a specific usage of the API.

Once the models are constructed in operation 204, the models may be categorized in operation 206. That is, each of the models may be associated with one or more specific clients, usage situations, APIs, or other situations. In some embodiments, the models may be associated with one or more keywords. A match rate may be determined based on the keywords. In some embodiments, the keywords may be keywords determined from a request for usage of the API. The match rate may be determined by weighting the keywords and/or performing one or more calculations based on the keywords and a model selected based on the match rate and the category of the model. The technique finishes in operation 208.

Figure 3:
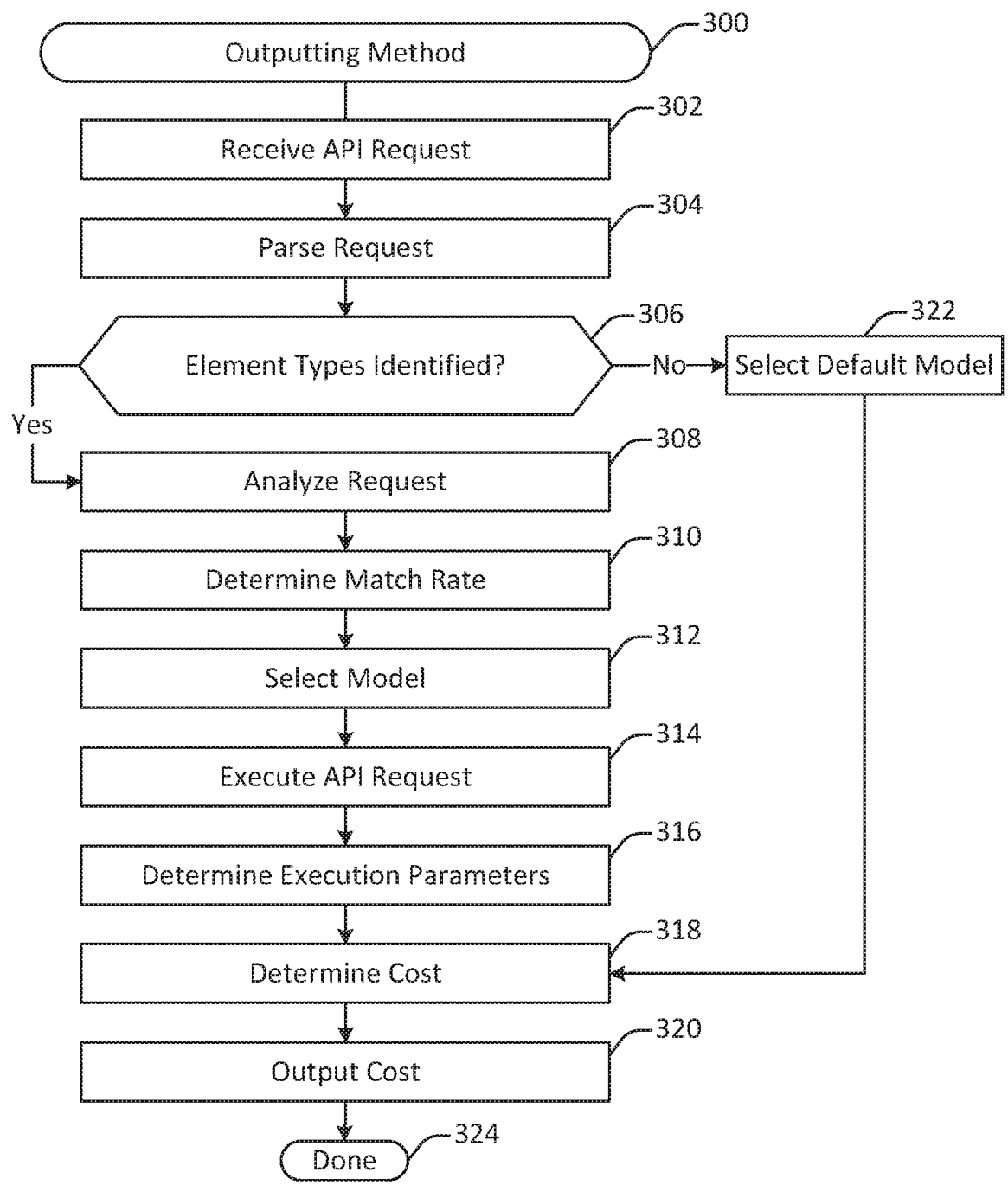
FIG. 3 illustrates an example of a method for utilizing dynamic API cost models, performed in accordance with one or more embodiments.

FIG. 3 illustrates an example of a method for utilizing dynamic API cost models, performed in accordance with one or more embodiments. Outputting method 300 may be a method allowing for determination of an API usage cost. In operation 302, an API request is received. The API request received in operation 302 may be similar to the API request received in operation 104. In some embodiments, the API request may be received in the form of a file such as a JSON, text file, or other such file. Thus, in the example described herein, Ahsoa, Inc. may receive an API request from an overlanding trip planning service provider. The API request is in the form of a JSON file indicating the parameters required for the trip.

In operation 304, the API request is parsed to determine the contents of the request. In various embodiments, parsing the API request may include analyzing the file of the API request. Such analyzing may include parsing the file to determine if any indicators are present within the API request. Indicators may include keywords and characters associated with factors or request elements. In certain examples, parsing may include only scanning for one or more indicators. Thus, for example, the JSON API request received by Ahsoa, Inc. may be parsed to only determine if the indicators "maximum toll cost," "maximum travel distance," and "days of travel" are present.

In operation 306, based on the parsing, a determination is made as to whether any indicators are present within the API request. Referring to the previous example, if any of the indicators "maximum toll cost," "maximum travel distance," or "days of travel" are present, the technique may proceed to operation 308. Otherwise, the technique may proceed to operation 322. The lack of indicators may be associated with requests lacking in complexity or special features of the API and, thus, a request that is of a lower value or a set value.

If no indicators are identified in operation 306, method 300 may proceed to operation 322 and a default cost model is selected. The default cost model may be, for example, a set per use cost, an agreed upon default cost, a cost based purely on computational resources used, a cost based purely on the type of API used, and/or another such default value. The default cost may be accordingly determined in operation 318.

If the parsing in operation 304 determines that one or more of the indicators are present within the API request, the full request or a portion thereof may be analyzed in operation 308. Analyzing the request may include analyzing the full request or a portion thereof to determine details of the API request. Thus, for example, the "maximum toll cost" may be determined to then include a corresponding value (e.g., the value of the maximum toll cost acceptable). Analyzing the request may thus include analyzing the API request to determine the value of the acceptable "maximum toll cost." Alternately, or additionally, other factors for selecting the model or determining the cost may be determined based on the analyzing. Such factors may include determining additional categories and/or any values associated with the additional categories. For example, while "maximum toll cost" may be an indicator, "maximum toll stops" may not be an indicator, but may be subsequently determined in operation 308 based on determining that the indicator "maximum toll cost" is present. Additionally, the values associated with "maximum toll stops" and "maximum toll cost" may also be determined.

In some embodiments, characteristics of the client, the end user, and/or other parties associated with the API request may also be analyzed. Such analysis may be based on data received within the API request, from stored data within a database (e.g., from data that was previously received that is associated with such parties), from data received from other sources (e.g., from services that provide data on the various parties associated with the API request), from the client and/or the end user (e.g., in the form of answers to a survey), and/or from other such sources. Such data may include, for example, the value of the service to the client (e.g., whether the output of the API is used for internal processes that are core or ancillary to the client's business, used for a product that is offered for a high value, a low value, or for free, used for testing or validation purposes, used in development of other items, used for research, and/or used for another such purpose), the ability of the client to afford the API usage, the business model of the client, the geographical area of the client, the value to the client of utilizing the API output as regards to revenue, business strategy, public relations, and/or other such strategy, and/or other such considerations. Furthermore, such data may include whether the party providing the API views the client or end user as a special interest (e.g., whether discounts should be applied) or as a competitor. In some embodiments, such data may allow determination of a value of the usage of the API to the client and/or the end user.

Also, in some embodiments, market demand or an internal valuation for the API or the requested features of the API may also be determined in operation 308. Thus, in the example of Ahsoa, Inc., the API may include a variety of features. Analyzing the API request may include determining if the request includes requests for higher and/or lower value features. The model may be selected based on whether higher and/or lower value features are requested.

Based on the analyzing in operation 308, a match rate may be determined in operation 310. The match rate may be determined as described herein. In various embodiments, a match rate (e.g., a match rate score) may be determined between the API request and one, some, or all of the models. The match rate may be determined utilizing the indicators and/or the elements identified in operation 306. Thus, for example, the request may be determined to have a higher match rate with any models that include both "toll stops" and "toll cost" as inputs.

In some embodiments, the values associated with the categories may also be used to determine the match rate. Thus, for example, a first model may be configured to be utilized if "maximum toll cost" is between $0-10 while a second model may be configured to be utilized if "maximum toll cost" is greater than $10. Thus, if the API request includes a "maximum toll cost" that is between $0-10, the determined match rate may be greater for the first model than for the second model. If the API request includes a "maximum toll cost" greater than $10 or an undefined value (indicating unlimited values), then the determined match rate for the second model may be greater than for the first model.

Based on the match rate(s) determined in operation 310, a model may be selected in operation 312. In various embodiments, a plurality of models may be associated with a client. The model with the highest determined match rate that is associated with the client may be selected. In certain situations, such as if the determined match rates are all below a threshold, a default model (e.g., a per use model, a model solely based on processing resources used, or other such models) may be selected. The model may determine a cost for the API usage.

Once the model has been selected, the API request may be performed in operation 314. Thus, the request may be processed by the API. During processing of the API, various parameters associated with executing the API may be tracked in operation 316. For example, processing and memory resources used and/or features of the API used during execution of the API processes may be tracked. Additionally, if multiple servers are used during execution, such parameters may be determined as well.

In operation 318, a usage cost of the API is determined. In some embodiments, the usage cost may be determined using the model selected in operation 312 and with various parameters determined in operation 308 as inputs into the model. Such inputs include inputs as described herein and may include, for example, indicators and other categories and associated values, characteristics of the client, the end user, and/or other parties, the parameters associated with processing the API request, and preferences of the API service provider (e.g., whether the API service provider wishes to price the API higher or lower), the market value of the API, which features of the API are requested, the valuation of the features, and other such inputs. The models may utilize the inputs and provide a cost output by performing transformations of the inputs. The cost of the API usage may, thus, be determined based on the query of the client.

The cost determined in operation 318 may be output in operation 320. The cost may be output to various charging services of the API service provider, which will then debit or bill the client, and/or may be provided to the client and other parties. The technique finishes at operation 324.

Figure 4:
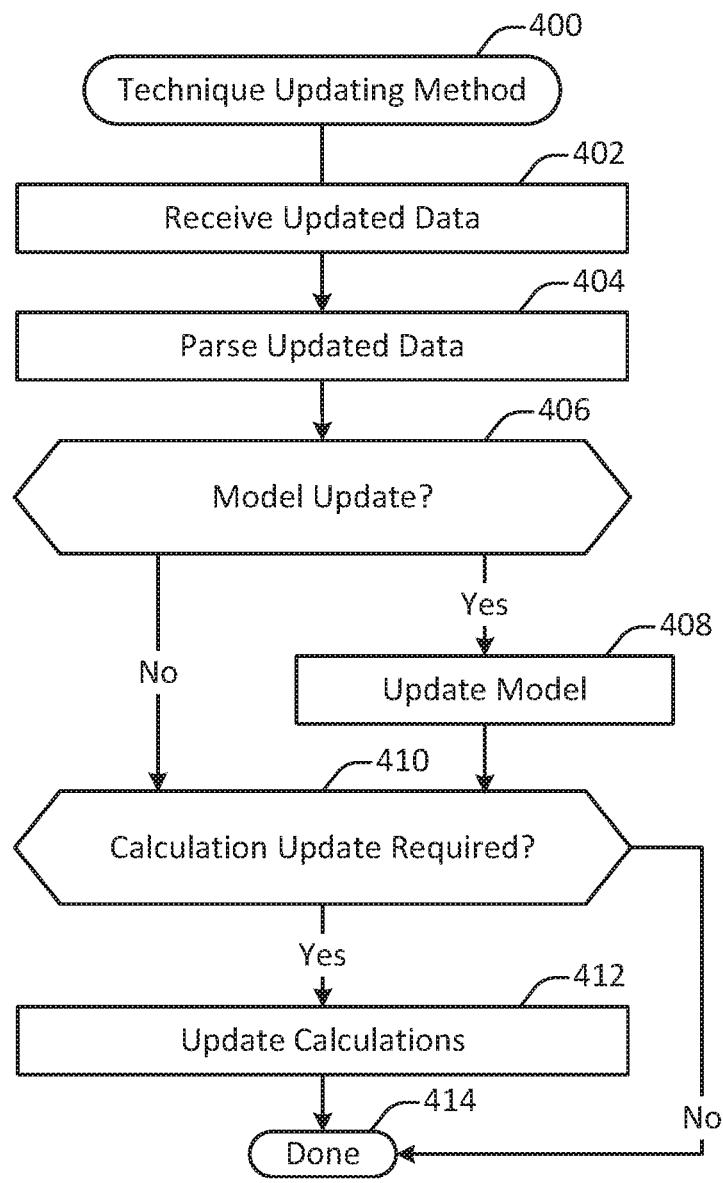
FIG. 4 illustrates an API cost model updating technique, performed in accordance with one or more embodiments.

FIG. 4 illustrates an API cost model updating technique, performed in accordance with one or more embodiments. In various embodiments, technique updating method 400 may be used to update the models described herein. Such updates may occur before receiving a new API request (e.g., in operation 302), before determining the API usage cost (e.g., in operation 316), and/or after determining or providing an output (e.g., in operations 318 or 320).

In operation 402, updated data may be received. The updated data may include data from a new API request, updated data associated with the client, updated data associated with possible end users of the client's product, updates to the API, updated business goals of the API provider, updates to the allowed usage of the API (e.g., due to regulatory regimes), updates to the valuation and/or popularity of various API features, and/or other such updates that are associated with operation and execution of the API. In various embodiments, each new API request may be treated as updated data.

In operation 404, the updated data is parsed. Parsing of the updated data may include scanning for various indicators to determine if more detailed analysis of the updated data is needed. The indicators for updating of data may be the same or may be different from the indicators used to parse the API request in operation 304. In some embodiments, the updated data may be fully analyzed without an initial parsing operation. Alternately, or additionally, the data may indicate that a model update is required.

Based on such analysis, whether the model should be updated is determined in operation 406. In some embodiments, if any qualifying data (e.g., the data identified in operation 404) is updated, an update to the model is needed.

Alternately, or additionally, a determination is made as to whether the updated data warrants a model update. In various embodiments, a plurality of models may be present and a determination may be performed for each of the models as to whether a model update is needed. Thus, for example, a determination may be made that only models that utilize the updated data as inputs may be updated. In another example, a determination may be made that only models that are impacted by the updated data may be updated. As such, for example, if the updated data indicates that the client has set the "maximum toll stops" at 15 for all executions of Ahsoa, Inc.'s API, only models that may be used for a number of toll stops greater than 15 are updated. Thus, if the model is used for toll stops of between 0-10, that model is not updated. However, a model used for toll stops greater than 10 is updated.

If a model update is required, the model is updated in operation 408. The model may be updated by, for example, updating the input parameters, the weights, the calculations used in the transformations, and other aspects of the model. The categorization of the model may also be updated. As such, certain models may be associated with certain clients and/or certain query categories (e.g., certain models may be associated only with requests for mapping APIs). The association of the models to the clients and/or the categories may be updated.

Whether the model is updated or not, in optional operation 410, a determination is made as to whether an updated cost calculation is required with the updated model. In certain situations, if the model is updated to affect an element associated with an input, the calculation may be updated. Thus, for some of Ahsoa, Inc.'s APIs may include a value associated with "stops specified" as an input. If a model changes a weight associated with "stops specified," then an API request that includes a value for "stops specified" may be updated in calculation. If a calculation update is needed, the calculation is updated in operation 412. Otherwise, the technique finishes at operation 414.

According to various embodiments, the operations described herein may be performed once, a plurality of times, periodically, iteratively, or in another manner.

Figure 5:
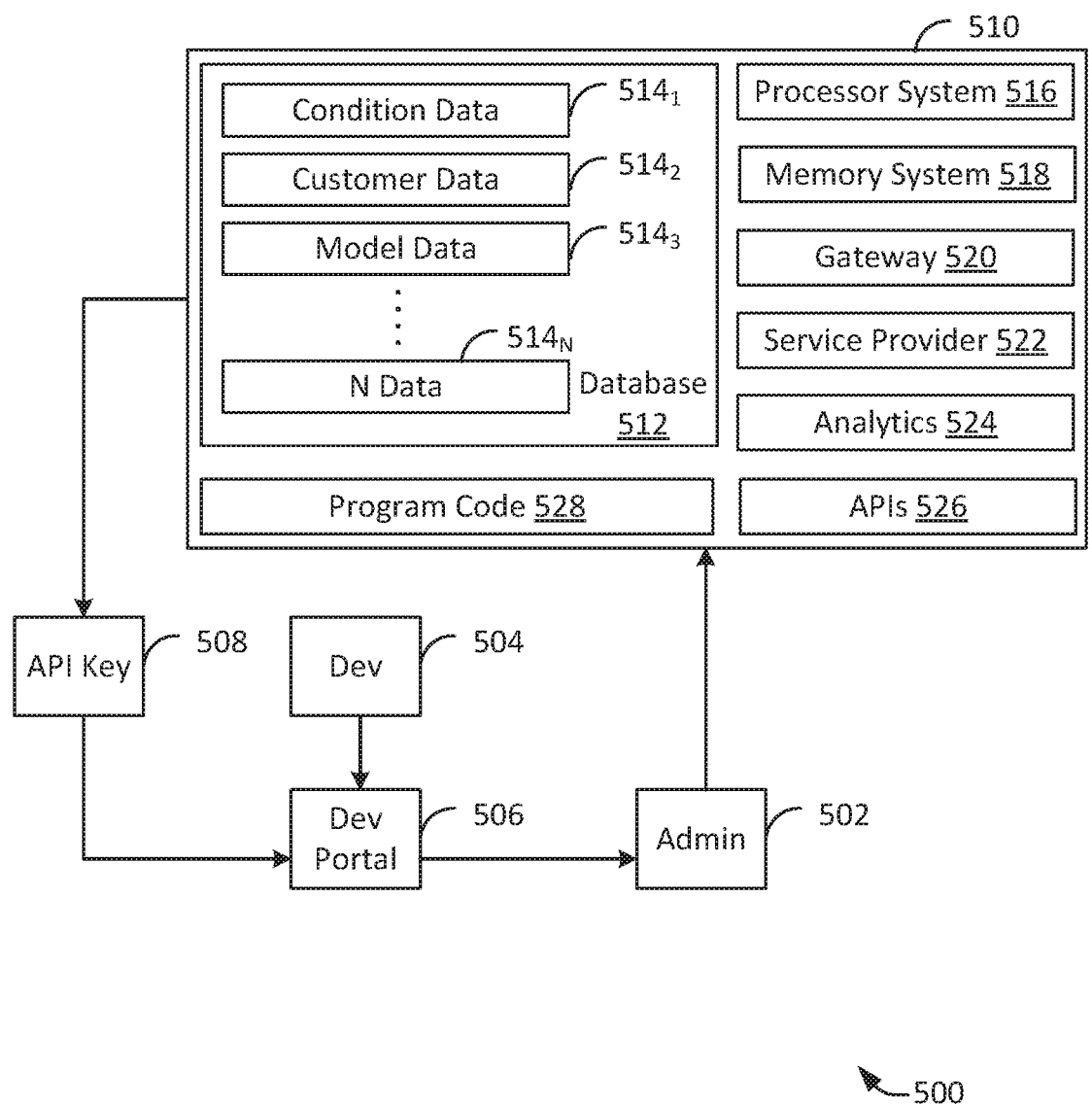
FIG. 5 illustrates an example configuration of an API monetization system, configured in accordance with one or more embodiments.

FIG. 5 illustrates an example configuration of an API monetization system, configured in accordance with one or more embodiments. The system of FIG. 5 illustrates an active-design configuration of an API monetization.

The system of FIG. 5 includes a server device 510, an administrator 502, a dev 504, a dev portal 506, and an API key 508. In various embodiments, server device 510 may database 512, processor system 516, memory system 518, gateway 520, service provider 522, analytics 524, APIs 526, and program code 528. Server device 510 may be associated with an API service provider.

Database 512 is configured to store data associated with models to determine API usage costs. Such data may include condition data 514$_1$, customer data 514$_2$, model data 514$_3$, as well as other such data. Condition data 514$_1$ may be associated with conditions for execution of the APIs. That is, regulatory data, environmental conditions, and other such variable data that may affect execution of the APIs may be stored as such. Customer data 514$_2$ may be data associated with clients and/or end users of the clients' services. Model data 514$_3$ may be data associated with various models as described herein.

Processor system 516 may be one or more processors configured to perform the operations described herein. Memory system 518 may be solid state, hard drive, random access, or other types of memory used for operation of server device 510. Program code 528 may be code utilized to execute the techniques described herein.

Gateway 520 may be a gateway to receive requests for usage of various APIs 526 of the API service provider. Service provider 522 may execute the stored APIs 526 as requested as well as provide the requests from execution of the APIs 526. Analytics 524 may track and analyze various data to optimize the models and APIs. Such data may include data associated with the APIs (e.g., request rates based on costs charged), data resulting from execution of the APIs (e.g., processing resources typically associated with execution of the APIs), as well as responses of the clients, end users, and other parties.

In various embodiments, dev 504 may be a client or another party requesting usage of the API through dev portal 506. Dev portal 506 may be a portal configured to provide API requests to admin 502 and to receive results from the execution of the API. Admin 502 may receive the API request, determine that dev portal 506 properly requested the API usage (e.g., is properly authenticated and/or includes the proper keys), and request that server device 510 execute the API request. Furthermore, dev portal 506 may request API key 508 through admin 502. In various embodiments, server device 510 may generate API key 508 and communicate API key 508 to dev portal 506. Dev portal 506 may accordingly request execution of an API based on the API key 508.

Figure 6:
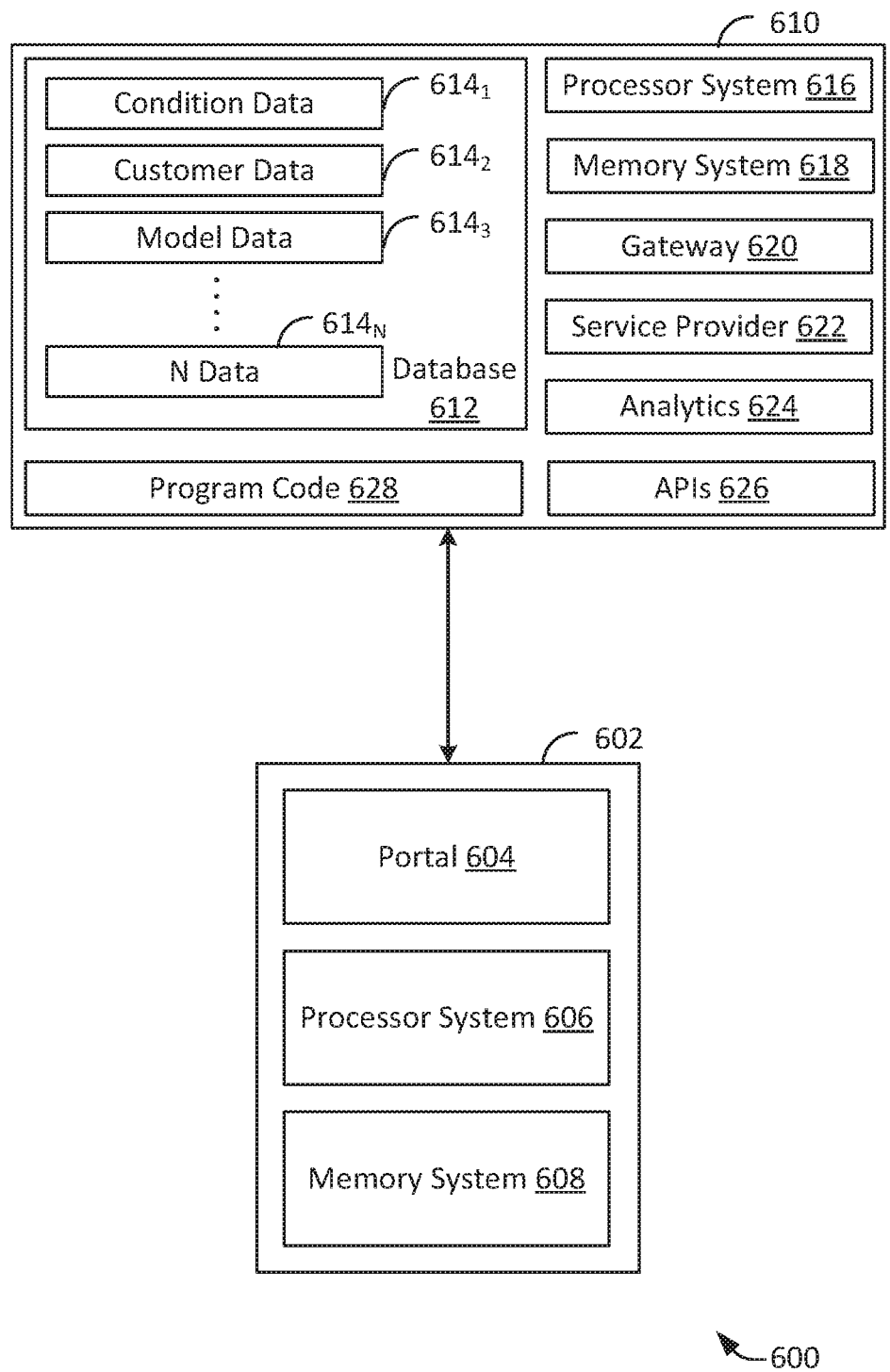
FIG. 6 illustrates another example configuration of an API monetization system, configured in accordance with one or more embodiments.

FIG. 6 illustrates another example configuration of an API monetization system, configured in accordance with one or more embodiments. The system of FIG. 6 illustrates an active-active configuration of an API monetization.

The system of FIG. 6 includes a server device 610 and dev device 602. Server device 610 may be similar to server device 510 and may include equivalent components (e.g., database 612, processor system 616, memory system 618, etc.). Dev device 602 includes portal 604, processor system 606, and memory system 608. Processor system 606 and memory system 608 may be similar to that of processor system 516 and memory system 518 (as well as processor system 616 and memory system 618). Portal 604 may be similar to dev portal 506. Portal 604 may be configured to receive inputs from a user requesting execution of an API, provide API requests to server device 610, and receive results from the execution of the API.

Figure 7:
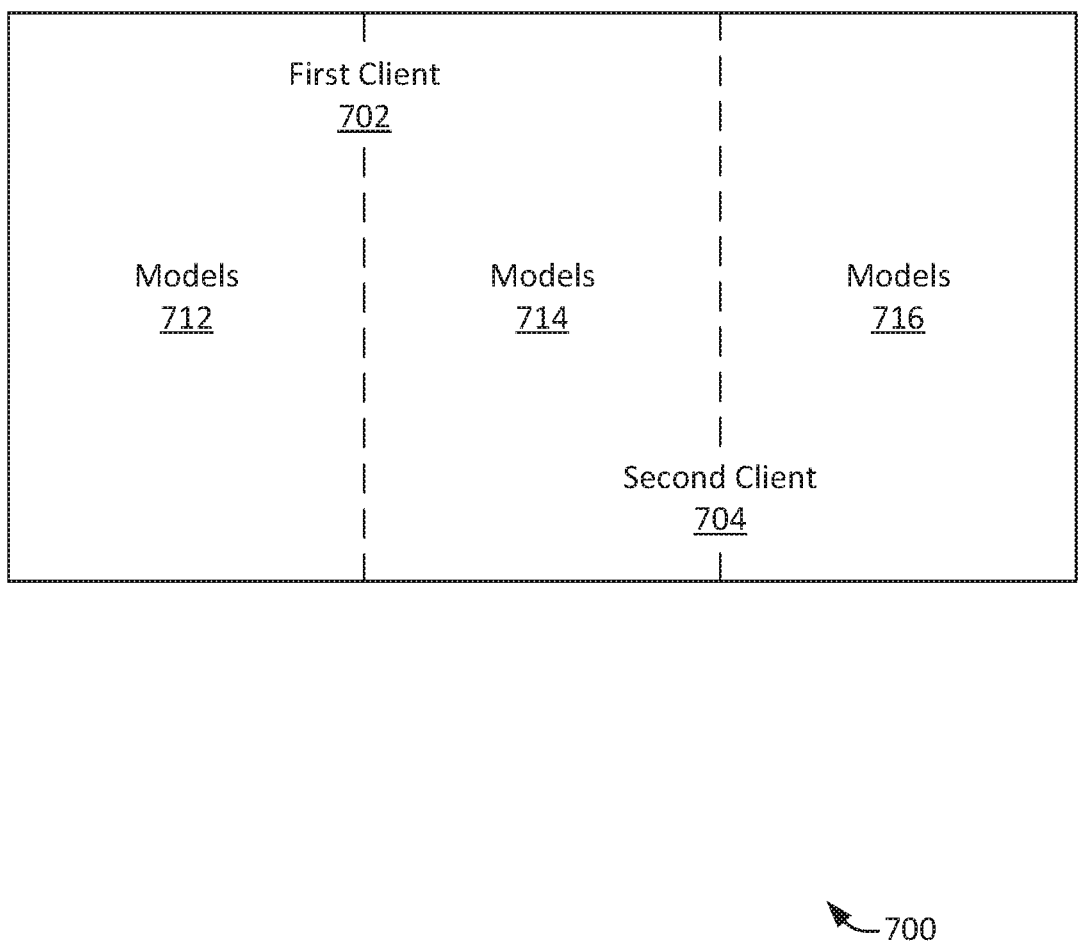
FIG. 7 illustrates an example of API cost model allocation, configured in accordance with one or more embodiments.

FIG. 7 illustrates an example of API cost model allocation, configured in accordance with one or more embodiments. FIG. 7 illustrates model groups 712, 714, and 716. In various embodiments, in the example of Ahsoa, Inc., first model group 712 may include models appropriate for calculating routes with tolls. Second model group 714 may be general use models appropriate for all situations. Third model group 716 may be models appropriate for calculating routes with multiple stops. First client 702 may be a party that allows for routes with tolls, but not routes with multiple destinations. Meanwhile, second client 704 may be a party that allows for routes with multiple destinations, but not for routes with tolls. As such, first client 702 is associated with model groups 712 and 714. Thus, the models in model groups 712 and 714 may be used to determine API usage costs for first client 702. Second client 704 is associated with model groups 714 and 716. Accordingly, the models in model groups 714 and 716 may be used to determine API usage costs for second client 704.

Figure 8:
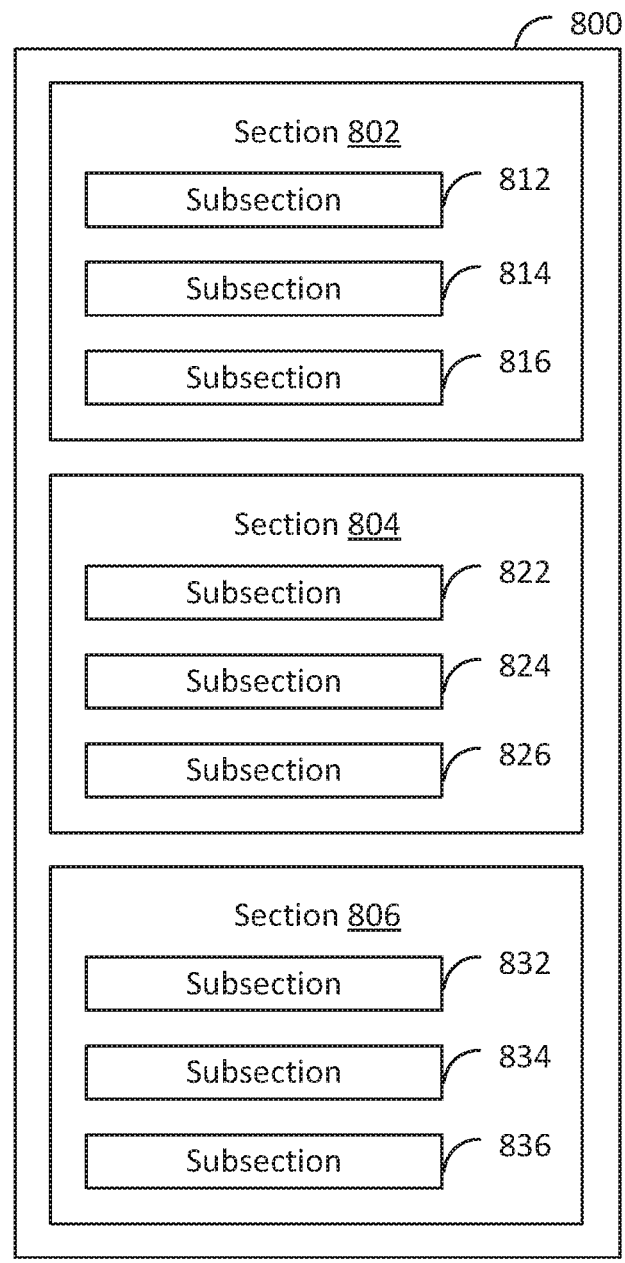
FIG. 8 illustrates an example of an API usage request, configured in accordance with one or more embodiments.

FIG. 8 illustrates an example of an API usage request, configured in accordance with one or more embodiments. API request 800 of FIG. 8 includes sections 802, 804, and 806. Each of sections 802, 804, and 806 includes corresponding subsections (e.g., subsections 812, 814, and 816 of section 802, subsections 822, 824, and 826 of section 804, and subsections 832, 834, and 836 of section 806).

In some embodiments, one or more of sections 802, 804, and 806 may be or include indicators. Such indicators may, when parsed, signify that further analysis is required of the section and/or of API request 800 generally. Thus, for example, section 804 may include an indicator. Parsing of API request 800 may identify section 804 as an indicator. In some embodiments, identifying section 804 as an indicator may cause API request 800 to be fully analyzed. Alternately, or additionally, identifying section 804 as an indicator may only cause subsections 822, 824, and 826 to be fully analyzed.

Whether the entire API request, the section, or one or more subsections are further analyzed may be specified by a default configuration, may be specified by the API request, and/or may be specified within the section itself. Thus, for example, by default, all of API request 800 may be analyzed upon determining that section 804 is an indicator. Section 804 may, however, indicate that, upon parsing, all of section 804 should be analyzed or only subsection 824 should be analyzed to determine the model to be selected. As such, upon determining an indicator, all or only a portion of an API request may be analyzed.

Figure 9:
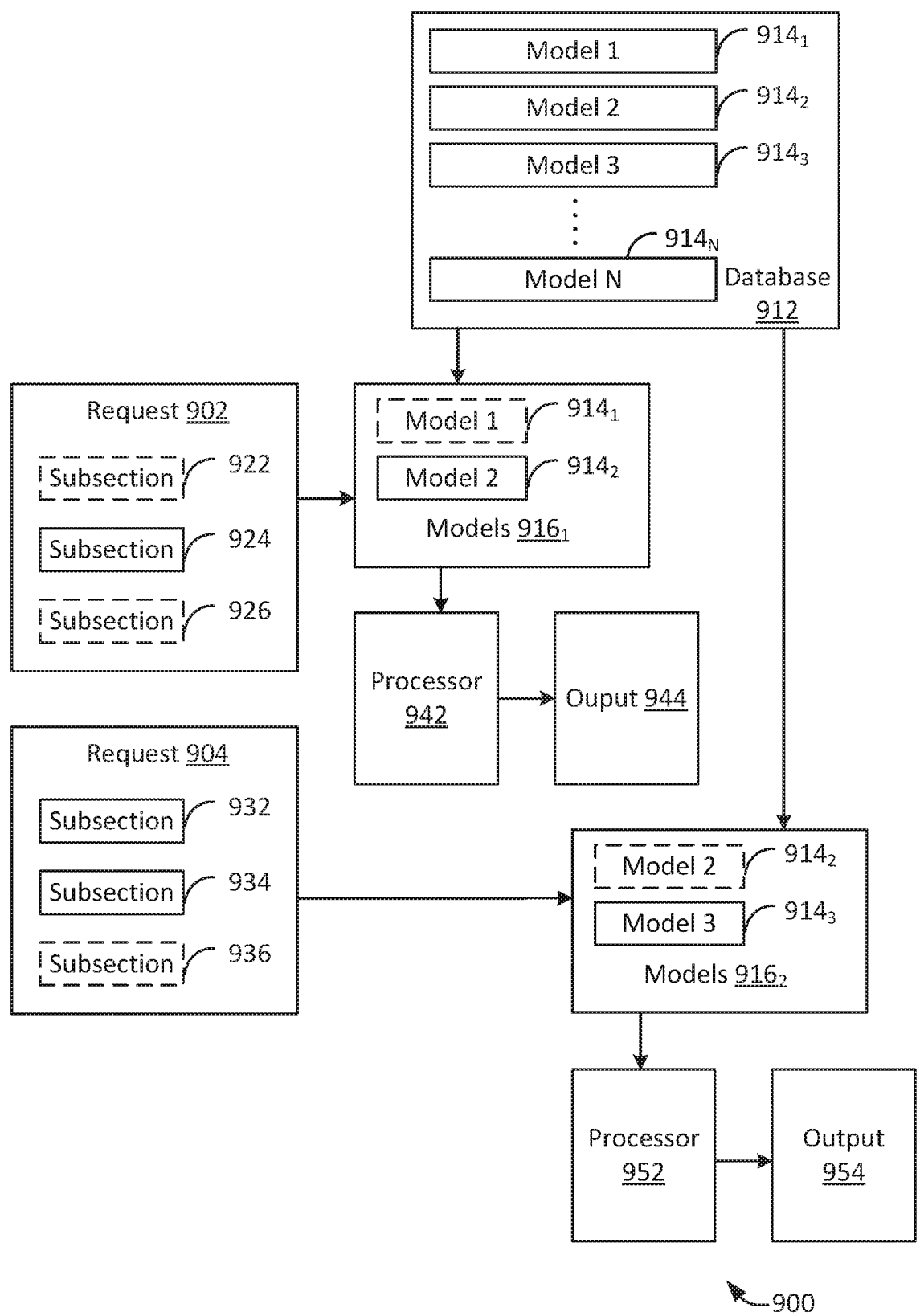
FIG. 9 illustrates an example configuration of an API monetization system associated with a plurality of clients, configured in accordance with one or more embodiments.

FIG. 9 illustrates an example configuration of an API monetization system associated with a plurality of clients, configured in accordance with one or more embodiments. FIG. 9 illustrates a system 900 that includes API requests 902 and 904, database 912, and model groups $916_1$ and $916_2$.

API requests 902 and 904 are separate API requests and include, respectively, subsections 922, 924, and 926 and subsections 932, 934, and 936. In the embodiment shown in FIG. 9, detecting that a subsection includes an indicator may cause only that subsection to be further analyzed. Database 912 may store a plurality of models $914_{1-N}$.

One, some, or all of the models may be associated with each API request (e.g., associated with the client of each API request). Thus, for example, model group $916_1$, which includes models $914_1$ and $914_2$, is associated with API request 902 due to the identity of the client of API request 902. Additionally, the API requests may be parsed and the appropriate models may be further selected based on the parsing. For example, based on parsing API request 904, it is determined that subsections 932 and 934 include indicators. Based on such indicators, model group $916_2$, which includes models $914_2$ and $914_3$, is selected as appropriate for API request 904.

Based on the API request, an appropriate model may be selected. The API request may be analyzed based on the parsing. In the example of FIG. 9, analysis of API request 902 identifies that subsection 924 includes an indicator. A match rate is determined from analysis of subsection 924. The highest match rate is determined to be with model $914_2$. As such, model $914_2$ is selected based on the match rate. API request 902 is then processed in processor 942 and output 944 is accordingly provided. Output 944 may include requests from execution of API request 902 as well as a cost for usage of the API.

Furthermore, analysis of subsections 932 and 934 of API request 904 results in a determination of a match rate that has the highest match with model $914_3$. API request 904 is then processed in processor 952 and output 954 is then provided.

Figure 10:
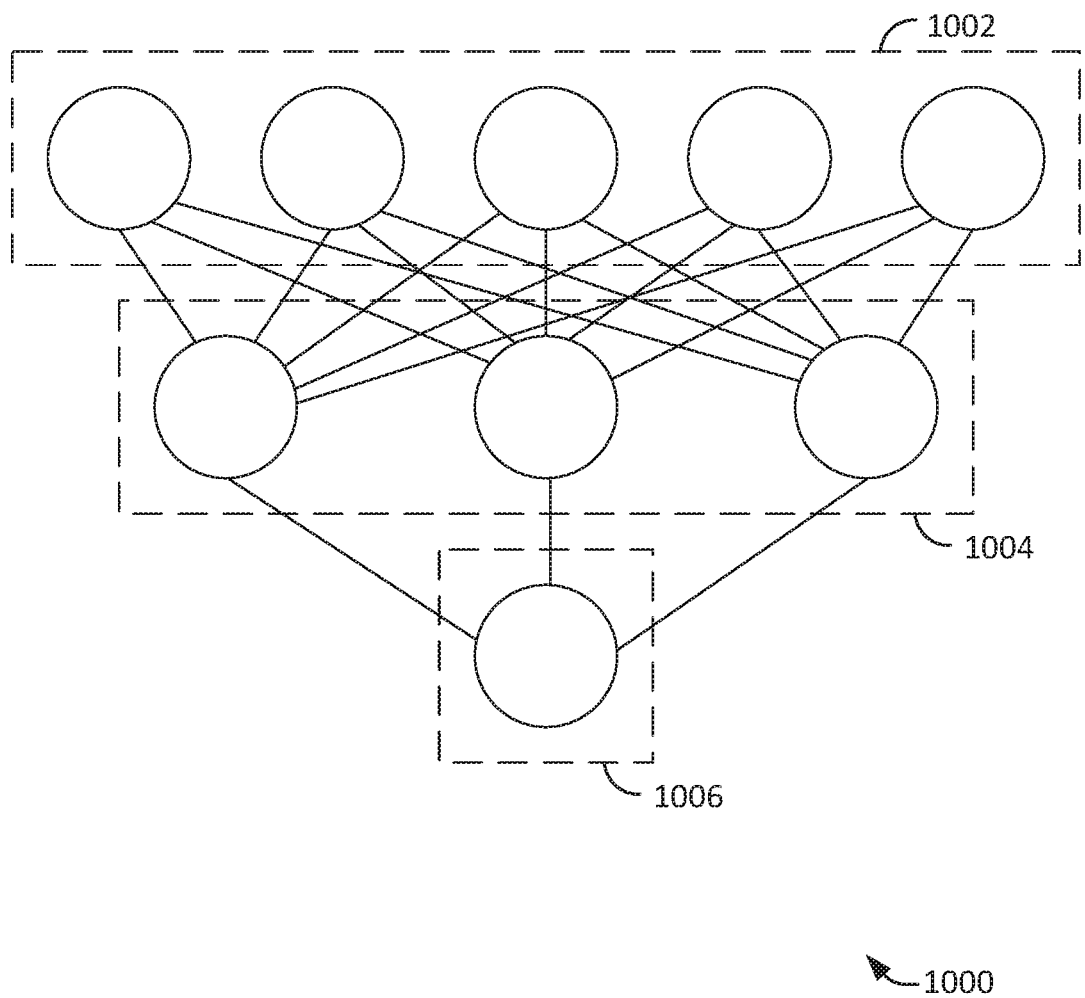
FIG. 10 illustrates an example configuration of a neural network, configured in accordance with one or more embodiments.

FIG. 10 illustrates an example configuration of a neural network, configured in accordance with one or more embodiments. FIG. 10 illustrates a neural network 1000 that includes input layer 1002, hidden layers 1004, and output layer 1006. Neural network 1000 may be a machine learning network that may be trained to create one or more API usage models and/or determine an API usage model for an API request. Input layer 1002 may be include inputs such as indicators, portions of the API request, characteristics of the client and/or the end user, other characteristics, preferences of the API provider, and/or other inputs. Hidden layers 1004 may be one or more intermediate layers where computation is performed with appropriate weights. Output layer 1006 may result from computation performed within hidden layers 1004 and may output one or more models as described herein.

Figure 11:
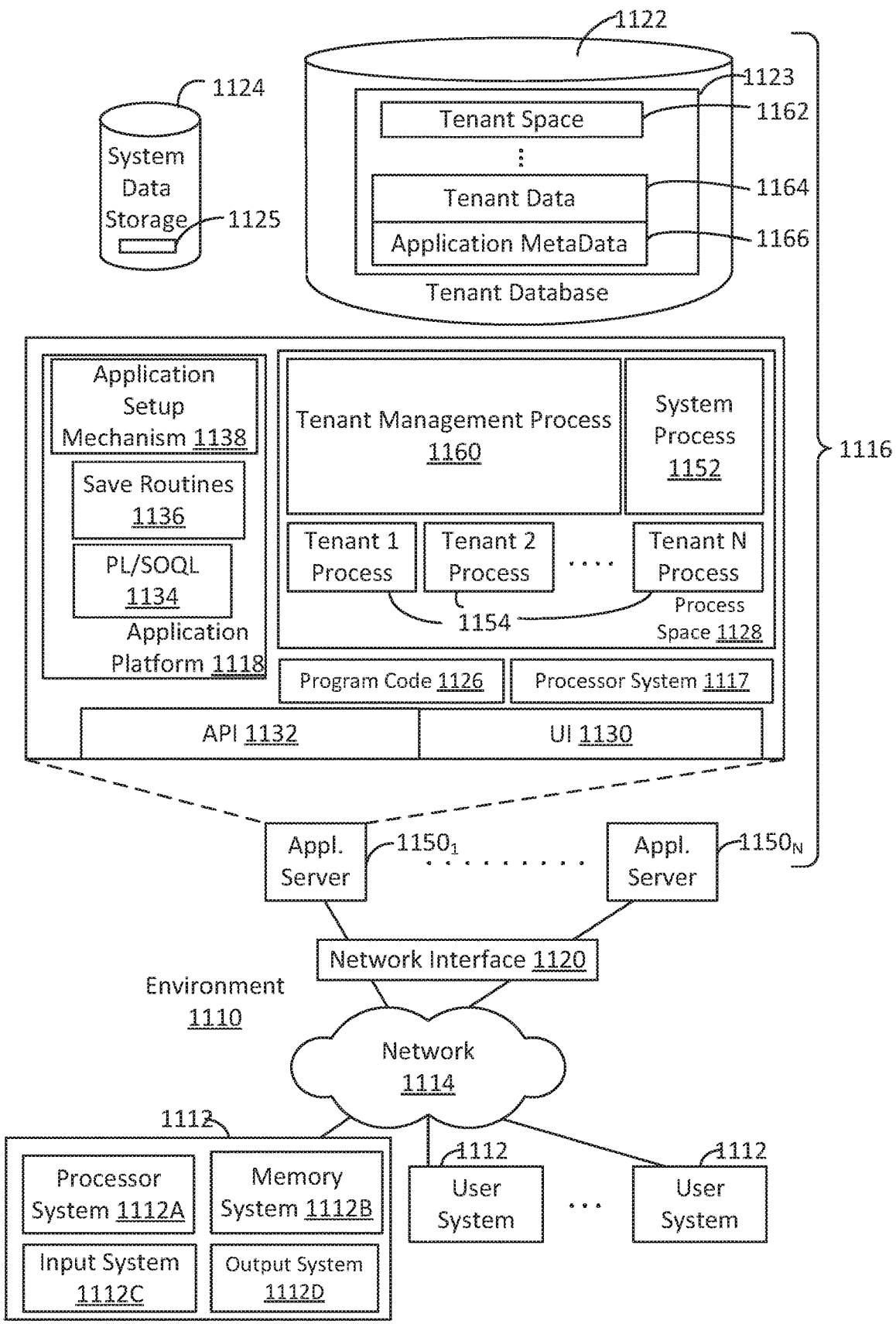
FIG. 11 illustrates an example of a computing system, configured in accordance with one or more embodiments.

FIG. 11 shows a block diagram of an example of an environment 1111 that includes an on-demand database service configured in accordance with some implementations. Environment 1111 may include user systems 1112, network 1114, database system 1116, processor system 1117, application platform 1118, network interface 1120, tenant data storage 1122, tenant data 1123, system data storage 1124, system data 1125, program code 1126, process space 1128, User Interface (UI) 1130, Application Program Interface (API) 1132, PL/SOQL 1134, save routines 1136, application setup mechanism 1138, application servers 1150-1 through 1150-N, system process space 1152, tenant process spaces 1154, tenant management process space 1160, tenant storage space 1162, user storage 1164, and application metadata 1166. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 1116, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 18 may be a framework that allows the creation, management, and execution of applications in system 1116. Such applications may be developed by the database service provider or by users or third-party application developers accessing the service. Application platform 1118 includes an application setup mechanism 1138 that supports application developers' creation and management of applications, which may be saved as metadata into tenant data storage 1122 by save routines 1136 for execution by subscribers as one or more tenant process spaces 1154 managed by tenant management process 1160 for example. Invocations to such applications may be coded using PL/SOQL 1134 that provides a programming language style interface extension to API 1132. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2011, and hereby incorporated by reference in its entirety and for all purposes. Invocations to applications may be detected by one or more system processes. Such system processes may manage retrieval of application metadata 1166 for a subscriber making such an invocation. Such system processes may also manage execution of application metadata 1166 as an application in a virtual machine.

In some implementations, each application server 1150 may handle requests for any user associated with any organization. A load balancing function (e.g., an F5 Big-IP load balancer) may distribute requests to the application servers 1150 based on an algorithm such as least-connections, round robin, observed response time, etc. Each application server 1150 may be configured to communicate with tenant data storage 1122 and the tenant data 1123 therein, and system data storage 1124 and the system data 1125 therein to serve requests of user systems 1112. The tenant data 1123 may be divided into individual tenant storage spaces 1162, which can be either a physical arrangement and/or a logical arrangement of data. Within each tenant storage space 1162, user storage 1164 and application metadata 1166 may be similarly allocated for each user. For example, a copy of a user's most recently used (MRU) items might be stored to user storage 1164. Similarly, a copy of MRU items for an entire tenant organization may be stored to tenant storage space 1162. A UI 1130 provides a user interface and an API 1132 provides an application programming interface to system 1116 resident processes to users and/or developers at user systems 1112.

System 1116 may implement a web-based API providing system. For example, in some implementations, system 1116 may include application servers configured to implement and execute API software applications. The application servers may be configured to provide related data, code, forms, web pages and other information to and from user systems 1112. Additionally, the application servers may be configured to store information to, and retrieve information from a database system. Such information may include related data, objects, and/or Webpage content. With a multi-tenant system, data for multiple tenants may be stored in the same physical database object in tenant data storage 1122, however, tenant data may be arranged in the storage medium (s) of tenant data storage 1122 so that data of one tenant is kept logically separate from that of other tenants. In such a scheme, one tenant may not access another tenant's data, unless such data is expressly shared.

Several elements in the system shown in FIG. 11 include conventional, well-known elements that are explained only briefly here. For example, user system 1112 may include processor system 1112A, memory system 1112B, input system 1112C, and output system 11 12D. A user system 1112 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 1112 to access, process and view information, pages and applications available from system 1116 over network 1114. Network 1114 may be any network or combination of networks of devices that communicate with one another, such as any one or any combination of a LAN (local area network), WAN (wide area network), wireless network, or other appropriate configuration.

The users of user systems 1112 may differ in their respective capacities, and the capacity of a particular user system 1112 to access information may be determined at least in part by "permissions" of the particular user system 1112. As discussed herein, permissions generally govern access to computing resources such as data objects, components, and other entities of a computing system, such as an API, a social networking system, and/or a CRM database system. "Permission sets" generally refer to groups of permissions that may be assigned to users of such a computing environment. For instance, the assignments of users and permission sets may be stored in one or more databases of System 1116. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 1116 may provide on-demand database service to user systems 1112 using an MIS arrangement. By way of example, one tenant organization may be a company that employs a sales force where each salesperson uses system 1116 to manage their sales process. Thus, a user in such an organization may maintain contact data, leads data, customer follow-up data, performance data, goals and progress data, etc., all applicable to that user's personal sales process (e.g., in tenant data storage 1122). In this arrangement, a user may manage his or her sales efforts and cycles from a variety of devices, since relevant data and applications to interact with (e.g., access, view, modify, report, transmit, calculate, etc.) such data may be maintained and accessed by any user system 1112 having network access.

When implemented in an MTS arrangement, system 1116 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 1116 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 1116 may also maintain system-level data usable by multiple tenants or other data. Such system-level data may include industry reports, news, postings, and the like that are sharable between tenant organizations.

In some implementations, user systems 1112 may be client systems communicating with application servers 1150 to request and update system-level and tenant-level data from system 1116. By way of example, user systems 1112 may send one or more queries requesting data of a database maintained in tenant data storage 1122 and/or system data storage 1124. An application server 1150 of system 1116 may automatically generate one or more SQL statements (e.g., one or more SQL queries) that are designed to access the requested data. System data storage 1124 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2011, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figure 12A:
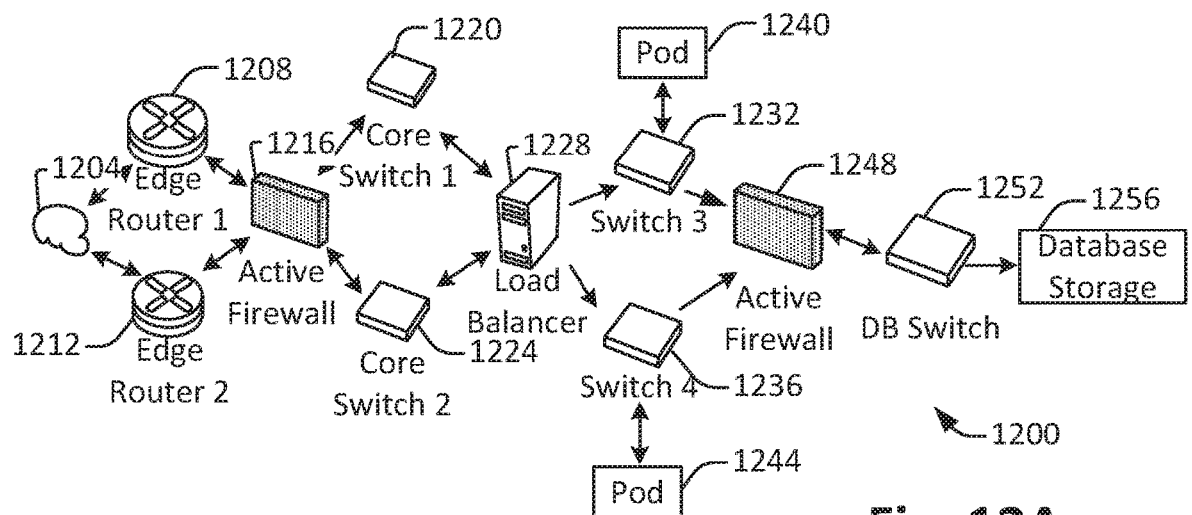
FIGS. 12A and 12B illustrate other examples of computing systems, configured in accordance with one or more embodiments.

FIG. 12A shows a system diagram of an example of architectural components of an on-demand database service environment 1200, configured in accordance with some implementations. A client machine located in the cloud 1204 may communicate with the on-demand database service environment via one or more edge routers 1208 and 1212. A client machine may include any of the examples of user systems 1112 described above. The edge routers 1208 and 1212 may communicate with one or more core switches 1220 and 1224 via firewall 1216. The core switches may communicate with a load balancer 1228, which may distribute server load over different pods, such as the pods 1240 and 1244 by communication via pod switches 1232 and 1236. The pods 1240 and 1244, which may each include one or more servers and/or other computing resources, may perform data processing and other operations used to provide on-demand services. Components of the environment may communicate with a database storage 1256 via a database firewall 1248 and a database switch 1252.

Accessing an on-demand database service environment may involve communications transmitted among a variety of different components. The environment 1200 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 12A and 12B.

The cloud 1204 refers to any suitable data network or combination of data networks, which may include the Internet. Client machines located in the cloud 1204 may communicate with the on-demand database service environment 1200 to access services provided by the on-demand database service environment 1200. By way of example, client machines may access the on-demand database service environment 1200 to retrieve, store, edit, and/or process API outputs.

In some implementations, the edge routers 1208 and 1212 route packets between the cloud 1204 and other components of the on-demand database service environment 1200. The edge routers 1208 and 1212 may employ the Border Gateway Protocol (BGP). The edge routers 1208 and 1212 may maintain a table of IP networks or 'prefixes', which designate network reachability among autonomous systems on the internet.

In one or more implementations, the firewall 1216 may protect the inner components of the environment 1200 from internet traffic. The firewall 1216 may block, permit, or deny access to the inner components of the on-demand database service environment 1200 based upon a set of rules and/or other criteria. The firewall 1216 may act as one or more of a packet filter, an application gateway, a stateful filter, a proxy server, or any other type of firewall.

In some implementations, the core switches 1220 and 1224 may be high-capacity switches that transfer packets within the environment 1200. The core switches 1220 and 1224 may be configured as network bridges that quickly route data between different components within the on-demand database service environment. The use of two or more core switches 1220 and 1224 may provide redundancy and/or reduced latency.

In some implementations, communication between the pods 1240 and 1244 may be conducted via the pod switches 1232 and 1236. The pod switches 1232 and 1236 may facilitate communication between the pods 1240 and 1244 and client machines, for example via core switches 1220 and 1224. Also or alternatively, the pod switches 1232 and 1236 may facilitate communication between the pods 1240 and 1244 and the database storage 1256. The load balancer 1228 may distribute workload between the pods, which may assist in improving the use of resources, increasing throughput, reducing response times, and/or reducing overhead. The load balancer 1228 may include multilayer switches to analyze and forward traffic.

In some implementations, access to the database storage 1256 may be guarded by a database firewall 1248, which may act as a computer application firewall operating at the database application layer of a protocol stack. The database firewall 1248 may protect the database storage 1256 from application attacks such as structure query language (SQL) injection, database rootkits, and unauthorized information disclosure. The database firewall 1248 may include a host using one or more forms of reverse proxy services to proxy traffic before passing it to a gateway router and/or may inspect the contents of database traffic and block certain content or database requests. The database firewall 1248 may work on the SQL application level atop the TCP/IP stack, managing applications' connection to the database or SQL management interfaces as well as intercepting and enforcing packets traveling to or from a database network or application interface.

In some implementations, the database storage 1256 may be an on-demand database system shared by many different organizations. The on-demand database service may employ a single-tenant approach, a multi-tenant approach, a virtualized approach, or any other type of database approach. Communication with the database storage 1256 may be conducted via the database switch 1252. The database storage 1256 may include various software components for handling database queries. Accordingly, the database switch 1252 may direct database queries transmitted by other components of the environment (e.g., the pods 1240 and 1244) to the correct components within the database storage 1256.

Figure 12B:
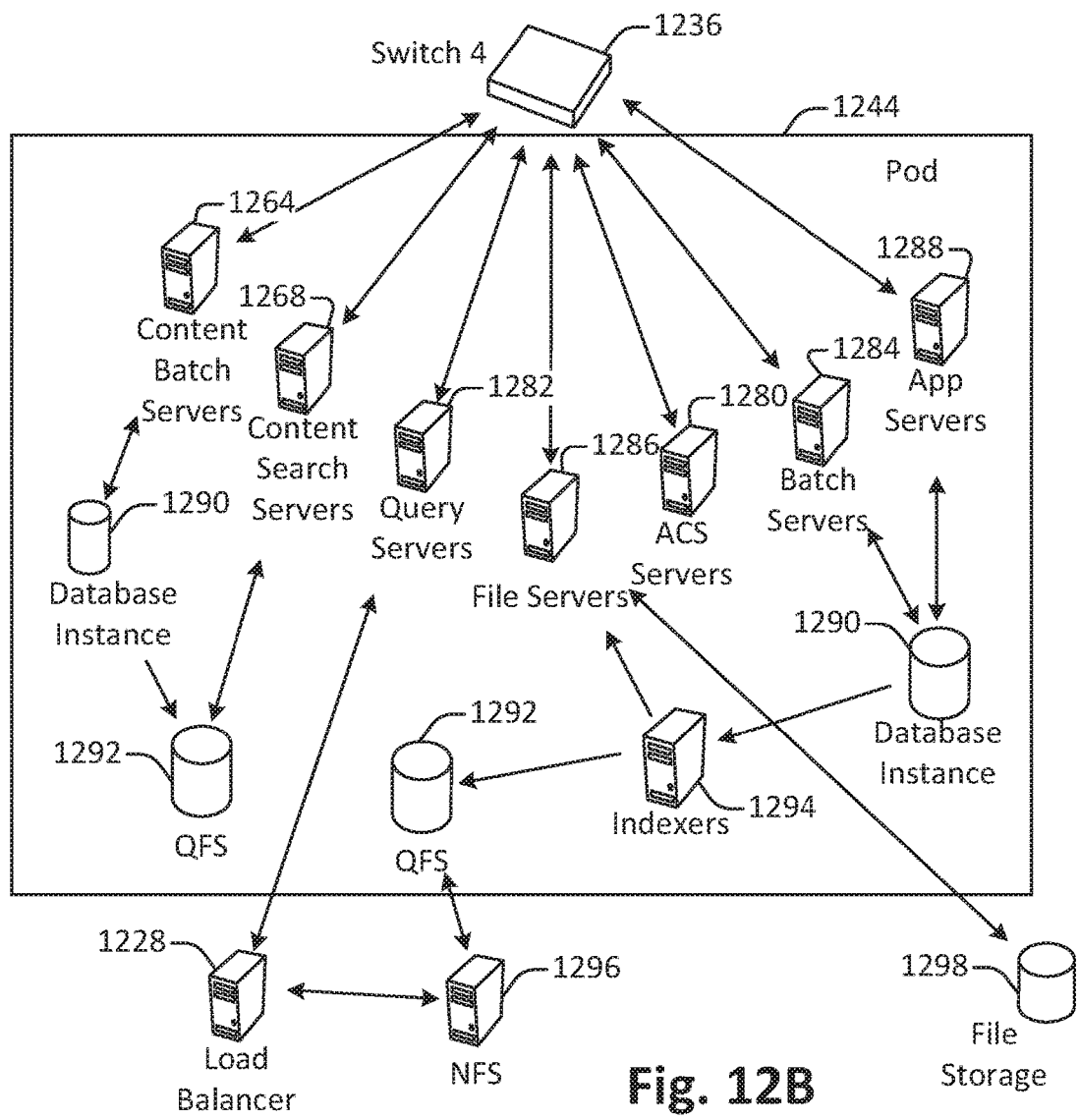

FIG. 12B shows a system diagram further illustrating an example of architectural components of an on-demand database service environment, in accordance with some implementations. The pod 1244 may be used to render services to user(s) of the on-demand database service environment 1200. The pod 1244 may include one or more content batch servers 1264, content search servers 1268, query servers 1282, file servers 1286, access control system (ACS) servers 1280, batch servers 1284, and app servers 1288. Also, the pod 1244 may include database instances 1290, quick file systems (QFS) 1292, and indexers 1294. Some or all communication between the servers in the pod 1244 may be transmitted via the switch 1236.

In some implementations, the app servers 1288 may include a framework dedicated to the execution of procedures (e.g., programs, routines, scripts) for supporting the construction of applications provided by the on-demand database service environment 1200 via the pod 1244. One or more instances of the app server 1288 may be configured to execute all or a portion of the operations of the services described herein.

In some implementations, as discussed above, the pod 1244 may include one or more database instances 1290. A database instance 1290 may be configured as an MIS in which different organizations share access to the same database, using the techniques described above. Database information may be transmitted to the indexer 1294, which may provide an index of information available in the database 1290 to file servers 1286. The QFS 1292 or other suitable filesystem may serve as a rapid-access file system for storing and accessing information available within the pod 1244. The QFS 1292 may support volume management capabilities, allowing many disks to be grouped together into a file system. The QFS 1292 may communicate with the database instances 1290, content search servers 1268 and/or indexers 1294 to identify, retrieve, move, and/or update data stored in the network file systems (NFS) 1296 and/or other storage systems.

In some implementations, one or more query servers 1282 may communicate with the NFS 1296 to retrieve and/or update information stored outside of the pod 1244. The NFS 1296 may allow servers located in the pod 1244 to access information over a network in a manner similar to how local storage is accessed. Queries from the query servers 1222 may be transmitted to the NFS 1296 via the load balancer 1228, which may distribute resource requests over various resources available in the on-demand database service environment 1200. The NFS 1296 may also communicate with the QFS 1292 to update the information stored on the NFS 1296 and/or to provide information to the QFS 1292 for use by servers located within the pod 1244.

In some implementations, the content batch servers 1264 may handle requests internal to the pod 1244. These requests may be long-running and/or not tied to a particular customer, such as requests related to log mining, cleanup work, and maintenance tasks. The content search servers 1268 may provide query and indexer functions such as functions allowing users to search through content stored in the on-demand database service environment 1200. The file servers 1286 may manage requests for information stored in the file storage 1298, which may store information such as documents, images, basic large objects (BLOBs), etc. The query servers 1282 may be used to retrieve information from one or more file systems. For example, the query system 1282 may receive requests for information from the app servers 1288 and then transmit information queries to the NFS 1296 located outside the pod 1244. The ACS servers 1280 may control access to data, hardware resources, or software resources called upon to render services provided by the pod 1244. The batch servers 1284 may process batch jobs, which are used to run tasks at specified times. Thus, the batch servers 1284 may transmit instructions to other servers, such as the app servers 1288, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 13:
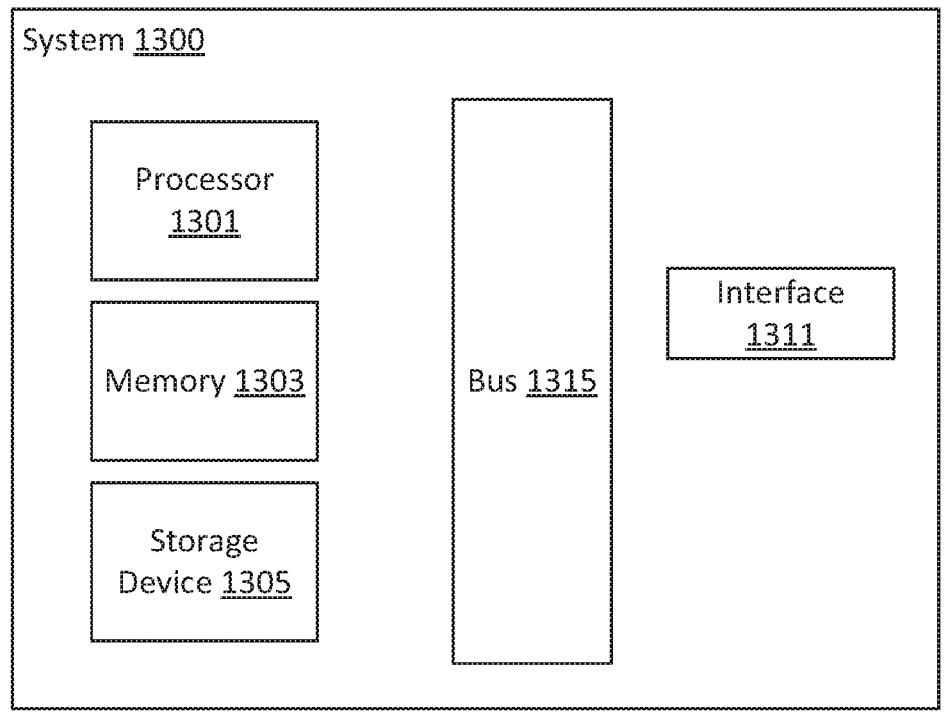
FIG. 13 illustrates an example of a computing device, configured in accordance with one or more embodiments.

FIG. 13 illustrates one example of a computing device. According to various embodiments, a system 1300 suitable for implementing embodiments described herein includes a processor 1301, a memory module 1303, a storage device 1305, an interface 1311, and a bus 1315 (e.g., a PCI bus or other interconnection fabric.) System 1300 may operate as variety of devices such as an application server, a database server, or any other device or service described herein. Although a particular configuration is described, a variety of alternative configurations are possible. The processor 1301 may perform operations such as those described herein. Instructions for performing such operations may be embodied in the memory 1303, on one or more non-transitory computer readable media, or on some other storage device. Various specially configured devices can also be used in place of or in addition to the processor 1301. The interface 1311 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of disclosed herein apply to a wide variety of computing environments. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

The invention claimed is:

1. A computer-implemented method implemented in an on-demand computing services environment, the method comprising:
   constructing, a plurality of application programming interface (API) cost models, each of the API cost models configured to utilize keywords as match rate inputs and weight the keywords to determine a match rate and configured to utilize request inputs to determine a usage cost;
   receiving, at a server, a first message from a client machine via a communication interface, the first message including an API request associated with a computing service provided via the on-demand computing services environment, wherein the API request comprises first request inputs that includes one or more keywords;
   parsing the API request to determine the first request inputs including the one or more keywords of the API request;
   determining the match rates between the API request and each of the plurality of API cost models, the match rates determined based at least on the weighting of the one or more parsed keywords of the API request by each of the API cost models;
   selecting one of the plurality of API cost models based on the match rate;
   executing the API request with the selected API cost model;
   determining a first usage cost for execution of the API request by the selected API cost model the selected API cost model utilizing one or more of the request inputs to determine the first usage cost; and
   transmitting to the client machine via the communication interface a second message including the first usage cost.

2. The computer-implemented method of claim 1, wherein the first message comprises a first indicator, and wherein the method further comprises:
   parsing the first message to determine the first indicator, wherein the match rate is determined based on the first indicator.

3. The computer-implemented method of claim 2, wherein the parsing the first message comprises scanning for one of a plurality of indicators, wherein the first indicator is one of the plurality of indicators, and wherein the method further comprises:
   analyzing the API request based on the determining the first indicator.

4. The computer-implemented method of claim 3, wherein the analyzing the API request comprises determining one or more of:
   a service value to the client;
   an amount of forecasted processing resources associated with the API request;

a location, local time, regulatory regime, and/or bandwidth associated with the client; and a type of service associated with the API request.

5. The computer-implemented method of claim 1, further comprising:

modifying, based on the API request, the selected API cost model, wherein the first usage cost is determined by applying the modified API cost model to the API request.

6. The computer-implemented method of claim 1, further comprising:

receiving at the server a third message from a client machine via the communication interface, the third message including an updated API request associated with the computing service provided via the on-demand computing services environment;

determining that the third message indicates an update to the selected API cost model;

updating the selected API cost model based on the third message;

determining a second usage cost for execution of the updated API request by the updated API cost model; and transmitting to the client machine via the communication interface a fourth message including the second usage cost.

7. The computer-implemented method of claim 1, further comprising:

comparing the match rates between the API request and each of the plurality of API cost models to a threshold match rate; and determining that the match rates between the API request and each of the plurality of API cost models is below the threshold match rate, wherein the API cost model selected is a default cost model.

8. The computer-implemented method of claim 1, wherein the plurality of API cost models are each associated with a first client.

9. A computer program product comprising computer-readable program code capable of being executed by one or more processors in an on-demand computing services environment when retrieved from a non-transitory computer-readable medium, the program code comprising instructions configurable to cause operations comprising:

constructing, a plurality of application programming interface (API) cost models, each of the API cost models configured to utilize keywords as match rate inputs and weight the keywords to determine a match rate and configured to utilize request inputs to determine a usage cost;

receiving, at a server, a first message from a client machine via a communication interface, the first message including an API request associated with a computing service provided via the on-demand computing services environment, wherein the API request comprises first request inputs that includes one or more keywords;

parsing the API request to determine the first request inputs including the one or more keywords of the API request;

determining the match rates between the API request and each of the plurality of API cost models, the match rates determined based at least on the weighting of the one or more parsed keywords of the API request by each of the API cost models;

selecting one of the plurality of API cost models based on the match rate;

executing the API request with the selected API cost model;

determining a first usage cost for execution of the API request by the selected API cost model, the selected API cost model utilizing one or more of the request inputs to determine the first usage cost; and transmitting to the client machine via the communication interface a second message including the first usage cost.

10. The computer program product of claim 9, wherein the first message comprises a first indicator, and wherein the operations further comprise:

parsing the first message to determine the first indicator, wherein the match rate is determined based on the first indicator.

11. The computer program product of claim 10, wherein the parsing the first message comprises scanning for one of a plurality of indicators, wherein the first indicator is one of the plurality of indicators, and wherein the operations further comprise:

analyzing the API request based on the determining the first indicator.

12. The computer program product of claim 11, wherein the analyzing the API request comprises determining one or more of:

a service value to the client;

an amount of forecasted processing resources associated with the API request;

a location, local time, regulatory regime, and/or bandwidth associated with the client; and a type of service associated with the API request.

13. The computer program product of claim 9, wherein the operations further comprise:

modifying, based on the API request, the selected API cost model, wherein the selected usage cost is determined by applying the modified API cost model to the API request.

14. The computer program product of claim 9, wherein the operations further comprise:

receiving at the server a third message from a client machine via the communication interface, the third message including an updated API request associated with the computing service provided via the on-demand computing services environment;

determining that the third message indicates an update to the selected API cost model;

updating the selected API cost model based on the third message;

determining a second usage cost for execution of the updated API request by the updated API cost model; and transmitting to the client machine via the communication interface a fourth message including the second usage cost.

15. The computer program product of claim 9, wherein the comparing the match rates between the API request and each of the plurality of API cost models to a threshold match rate; and determining that the match rates between the API request and each of the plurality of API cost models is below the threshold match rate, wherein the API cost model selected is a default cost model.

16. The computer program product of claim 9, wherein the plurality of API cost models are each associated with a first client.

17. A computing system implemented using a server system implemented in an on-demand computing services environment, the computer system comprising:
- a processor; and
- a non-transitory memory comprising instructions stored thereon to cause execution of operations comprising:
  - constructing, a plurality of application programming interface (API) cost models, each of the API cost models configured to utilize keywords as match rate inputs and weight the keywords to determine a match rate and configured to utilize request inputs to determine a usage cost;
  - receiving, at a server, a first message from a client machine via a communication interface, the first message including an API request associated with a computing service provided via the on-demand computing services environment, wherein the API request comprises first request inputs that includes one or more keywords;
  - parsing the API request to determine the first request inputs including the one or more keywords of the API request;
  - determining the match rates between the API request and each of the plurality of API cost models, the match rates determined based at least on the weighting of the one or more parsed keywords of the API request by each of the API cost models;
  - selecting one of the plurality of API cost models based on the match rate;
  - executing the API request with the selected API cost model;
  - determining a first usage cost for execution of the API request by the selected API cost model, the selected API cost model utilizing one or more of the request inputs to determine the first usage cost; and
  - transmitting to the client machine via the communication interface a second message including the first usage cost.

18. The computing system of claim 17, wherein the first message comprises a first indicator, and wherein the operations further comprise:
- parsing the first message to determine the first indicator, wherein the match rate is determined based on the first indicator.

19. The computing system of claim 18, wherein the parsing the first message comprises scanning for one of a plurality of indicators, wherein the first indicator is one of the plurality of indicators, and wherein the operations further comprise:
- analyzing the API request based on the determining the first indicator.

20. The computing system of claim 19, wherein the analyzing the API request comprises determining one or more of:
- a service value to the client;
- an amount of forecasted processing resources associated with the API request;
- a location, local time, regulatory regime, and/or bandwidth associated with the client; and
- a type of service associated with the API request.

* * * * *